US006040055A

United States Patent [19]

Baba et al.

[11] Patent Number: 6,040,055

[45] Date of Patent: Mar. 21, 2000

[54] SURFACE DISCHARGE ELEMENT AND A METHOD OF MAKING THE SAME

[75] Inventors: Seiji Baba, Chiba; Takashi Endo, Chikushino, both of Japan

[73] Assignee: Densoken Co., Ltd. & Shoei Chemical Inc., Japan

[21] Appl. No.: 08/869,171

[22] Filed: Jun. 4, 1997

[30] Foreign Application Priority Data

Jun. 6, 1996 [JP] Japan .................................... 8-166755

[51] Int. Cl.[7] ...................................................... B32B 17/00

[52] U.S. Cl. .......................... 428/428; 428/432; 428/210; 264/618; 264/681

[58] Field of Search .................................... 428/432, 428, 428/210; 264/618, 681

*Primary Examiner*—Timothy Speer

*Attorney, Agent, or Firm*—Evenson, McKeown, Edwards & Lenahan, P.L.L.C.

[57] ABSTRACT

Disclosed is an improved surface discharge element comprising a dielectric substrate having a discharge electrode on one surface and an inductive electrode on the other surface of the substrate, at least said discharge electrode being of a thick film conductor including conductive powder and lead-free glass as main constituents. The lead-free discharge electrode is physically resistive to erosion by electric discharge, and accordingly it can have an elongated life in use.

4 Claims, 3 Drawing Sheets

SURFACE DISCHARGE ELEMENT AND A METHOD OF MAKING THE SAME

BACKGROUND OF THE INVENTION

1. Field of the Invention

The present invention relates to a surface discharge element and a method of making the same, and more particularly to a surface discharge element appropriate for use in an ozonizer using surface discharge for producing ozone or in an ionizer producing low-temperature plasma, and a method of making such a surface discharge element. The term, "surface discharge" is used as equivalent to two-dimensional silent discharge or corona discharge.

2. Prior Arts

A surface discharge element comprises a dielectric substrate having a relatively small, discharge electrode on one surface and a relatively large, inductive electrode on the other surface of the substrate. Application of a high AC voltage between the opposite electrodes causes low-temperature plasma to appear around the discharge electrode, and then an inductive current (discharge current) flows through the dielctric substrate between the opposite electrodes. In case of application of the surface discharge element to the ozonizer a high frequency (50 Hz to 20 KHz), high voltage (3.5 KVpp to 10 KVpp) is applied to the surface discharge element to produce oxygen ions, which are allowed to bond surrounding oxygen. Thus, ozone can be effectively produced. The discharge electrode of the surface discharge element is made of tungsten (W), titanium dioxide ($TiO_2$), titanium nitride (TiN) and other materials. In making a discharge electrode by using for instance, tungsten an electrode pattern is printed on a ceramic substrate with tungsten, and then, the so tungsten-printed substrate is subjected to firing at 1,300° C. in a hydrogen furnace. In case that a discharge electrode is made by using titanium dioxide or titanium nitride the substrate is plasma-spray coated with such materials to form a discharge electrode thereon.

The firing in the hydrogen atmosphere or the plasma spray coating, however, requires an extra equipment which is large in size, and very expensive. Also, disadvantageously such processes are not appropriate for mass production. As for the plasma spray coating the coating is liable to be peeled off from the alumina substrate. In an attempt to solve such problems a thick film paste including conductive powder and glass powder as main constituents, which paste is well known as being used in making printed circuits and chip resistors, is applied onto a ceramic substrate by printing, and the so printed ceramic substrate is subjected to firing process. The surface discharge electrode thus produced is liable to be easily broken during electric discharge, and the life of the surface discharge electrode cannot be significantly extended even if the electrode is covered with protective glass coating.

In view of the above what is aimed at by the present invention is to solve the problems of: the discharge electrode being fragile; the life of the discharge electrode being relatively short; and the discharge electrode being unable to be produced with ease.

From the angle of facilitating the making of such electrodes it is most advantageous that a thick film conductor paste is applied and fired onto an insulating substrate, but the so made electrode is easily broken during discharge. The inventor found that this fragility is attributable to presence of lead in the paste; lead is introduced to lower the firing temperature, and then lead contents are sputtered by electric discharges to leave the discharge electrode. More specifically the discharge electrode is composed of a thick film conductor including conductive powder and glass, and the glass contains lead in the form of PbO, $Pb_3O_4$ and the like. The lead contents are sputtered and removed from the conductor by electric discharges, thereby reducing the strength of the discharge electrode.

One object of the present invention is to provide an improved surface discharge element whose discharge electrode is physically resistive to erosion by electric discharge, is long-lived for use, and is appropriate for mass production. Another object of the present invention is to provide a method of making such an improved surface discharge element.

To attain these objects a surface discharge element according to the present invention comprises a dielectric substrate having a discharge electrode on one surface and an inductive electrode on the other surface of the substrate, at least said discharge electrode being of a thick film conductor including conductive powder and lead-free glass as main constituents. Each of the discharge electrode and inductive electrode may have an insulating protective layer of lead-free glass thereon. Also, the insulating protective layer may contain an oxide filler to increase strength of the protective layer. Advantageously noble metal powder such as Au, Ag, Pd or Pt and their alloys, and powder of ruthenium oxides or other ruthenates may be used as conductive powder. Base metals such as Cu or Ni or their alloys may be used, too.

Prepared is a paste which contains as main constituents, powder of conductive material described above and lead-free glasses such as $SiO_2$—$B_2O_3$—ZnO glass, $SiO_2$—$B_2O_3$—ZnO—$Al_2O_3$ glass, $SiO_2$—$B_2O_3$—ZnO-alkaline earth metal oxide glass, $SiO_2$—$B_2O_3$—ZnO—$Al_2O_3$-alkaline earth metal oxide glass, $B_2O_3$—$Al_2O_3$-alkaline earth metal oxide glass, $SiO_2$—ZnO—$Al_2O_3$-alkaline earth metal oxide glass, and the paste thus prepared is applied onto one side of a dielectric substrate in the form of discharge electrode, and onto the other side of the dielectric substrate in the form of inductive electrode. The so applied electrode patterns are fired to provide a surface discharge element.

In an attempt to control the thermal expansion coefficient and other physical characteristics of the glass, alumina, zirconia, zircon, silica, cordierite, forsterite, mullite and other oxide filler along with coloring agents may be added to the glass paste. The protective layer has the effect of preventing the underlying electrode from being oxidized, and it is made of lead-free glass; glass containing lead is liable to lose its strength by allowing lead constituent to leave by discharge sputtering. Preferably the lead-free glass paste disclosed in Japanese Patent Application No.8-53,587 can be used in forming such protective layer.

Other objects and advantages of the present invention will be understood from the following description of preferred embodiments of the present invention, which is shown in accompanying drawings.

DESCRIPTION OF PREFERRED EMBODIMENTS

Figure 1:
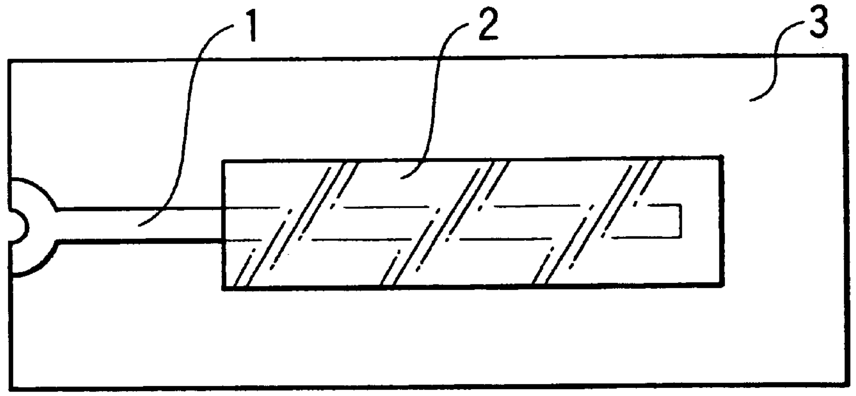
FIG. 1 is a top view of a surface discharge element according to the present invention.
Figure 2:
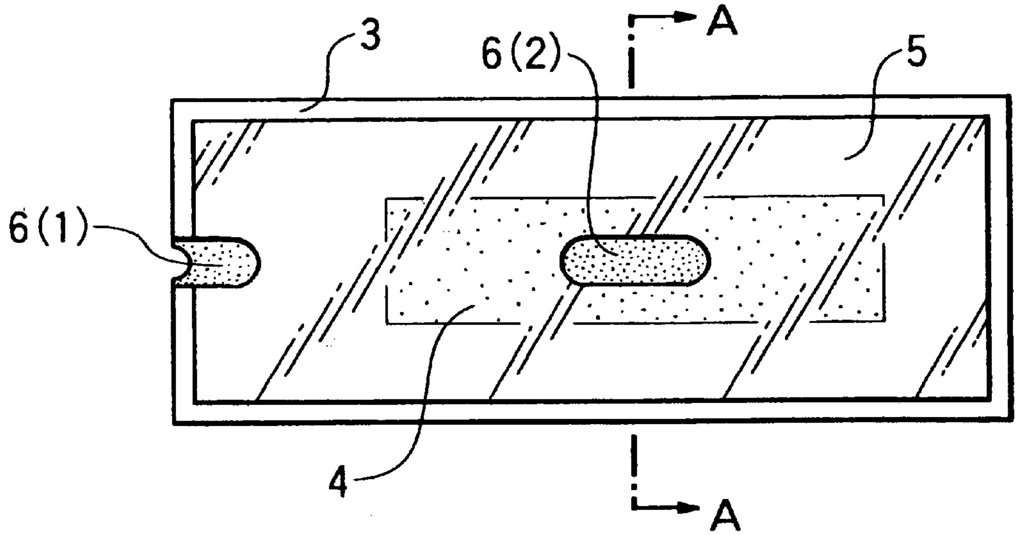
FIG. 2 is a bottom view of the surface discharge element.
Figure 3:
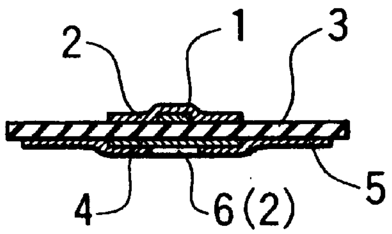
FIG. 3 is a cross section of the surface discharge element taken along the line A—A in FIG. 2.

Referring to FIGS. 1 to 3, a surface discharge element comprises an alumina substrate 3 having a discharge electrode 1 on one surface and an inductive electrode 4 on the other surface of the substrate 3. Each of the discharge electrode 1 and inductive electrode 4 has an insulating protective layer 2 or 5. High-voltage lead wires are to be soldered to terminals $\mathbf{6}_{(1)}$ and $\mathbf{6}_{(2)}$ (see FIG. 2). The terminal $\mathbf{6}_{(1)}$ is electrically connected to the discharge electrode 1.

The discharge electrode 1 is composed of a thick film conductor including conductive powder and lead-free glass as main constituents. In this particular embodiment a paste including powder of $RuO_2$, Ag/Pd alloy and $SiO_2$—$B_2O_3$—ZnO glass as main constituents was prepared; and the paste was applied to one surface of the substrate in the form of discharge electrode by printing; and the so printed substrate was subjected to the firing process. Likewise, another paste including powder of Ag/Pd alloy and glass was applied to the other surface of the substrate in the form of inductive electrode and terminal $\mathbf{6}_{(1)}$ pattern by printing; and the so printed substrate was subjected to the firing.

Then, an insulating paste including $SiO_2$—$B_2O_3$—ZnO—$Al_2O_3$-alkaline earth metal oxide glass and oxide filler was prepared; and the paste was applied to the discharge electrode pattern by printing; and the covering layer was fired to provide an insulating protective layer 2, which covers the underlying discharge electrode. The same insulating paste was applied to the whole area of the other surface of the substrate 3 excluding the terminals $\mathbf{6}_{(1)}$ and $\mathbf{6}_{(2)}$, and the whole covering was fired to provide an overlying protective layer 5. Firing temperature was about 850° C. The patterns of discharge electrode 1, inductive electrode 4, first insulating protective layer 2 and second insulating protective layer 5 can be sequentially printed and fired. Alternatively these patterns can be co-fired after having been printed on the substrate. Application of high-frequency (10 KHz), high-voltage (8 KV) between the terminals $\mathbf{6}_{(1)}$ and $\mathbf{6}_{(2)}$ of the surface discharge element generated high-frequency corona discharge around the discharge electrode 1 to produce ozone.

Figure 4:
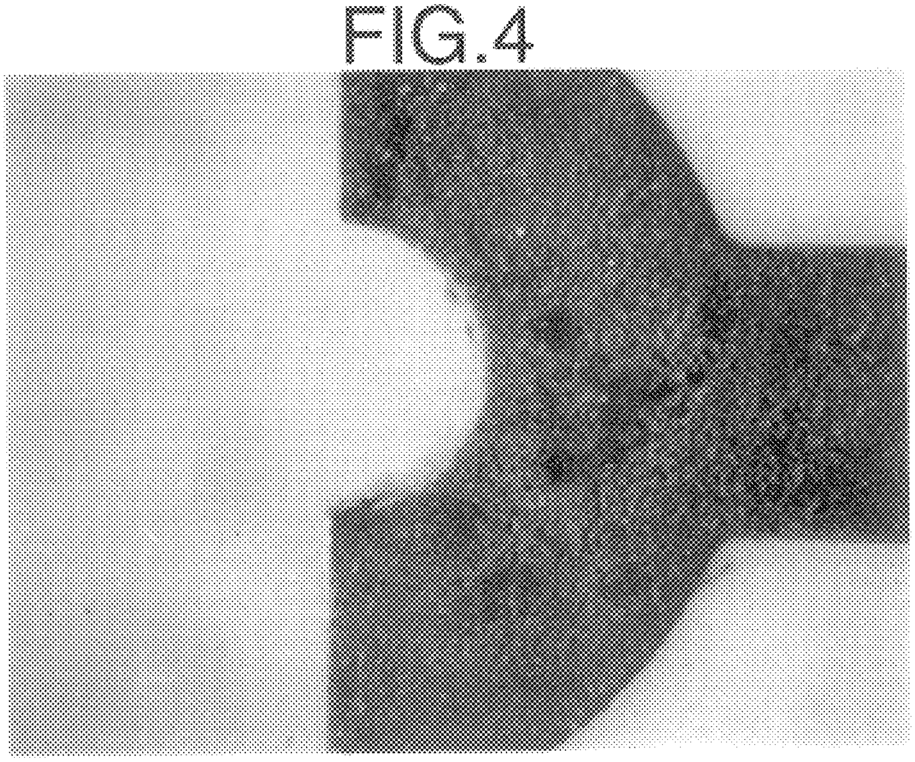
FIG. 4 is a microscopic photograph showing the tail of the discharge electrode of a surface discharge element according to the present invention after being used continuously for an elongated period.
Figure 5:
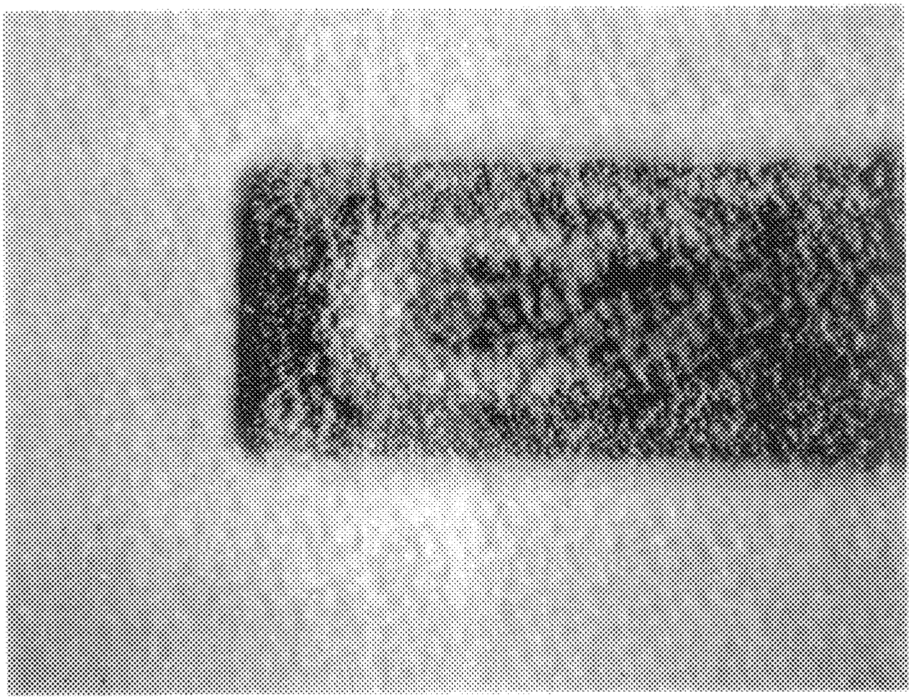
FIG. 5 is a microscopic photograph showing the head of the discharge electrode of the surface discharge element of FIG. 4.
Figure 6:
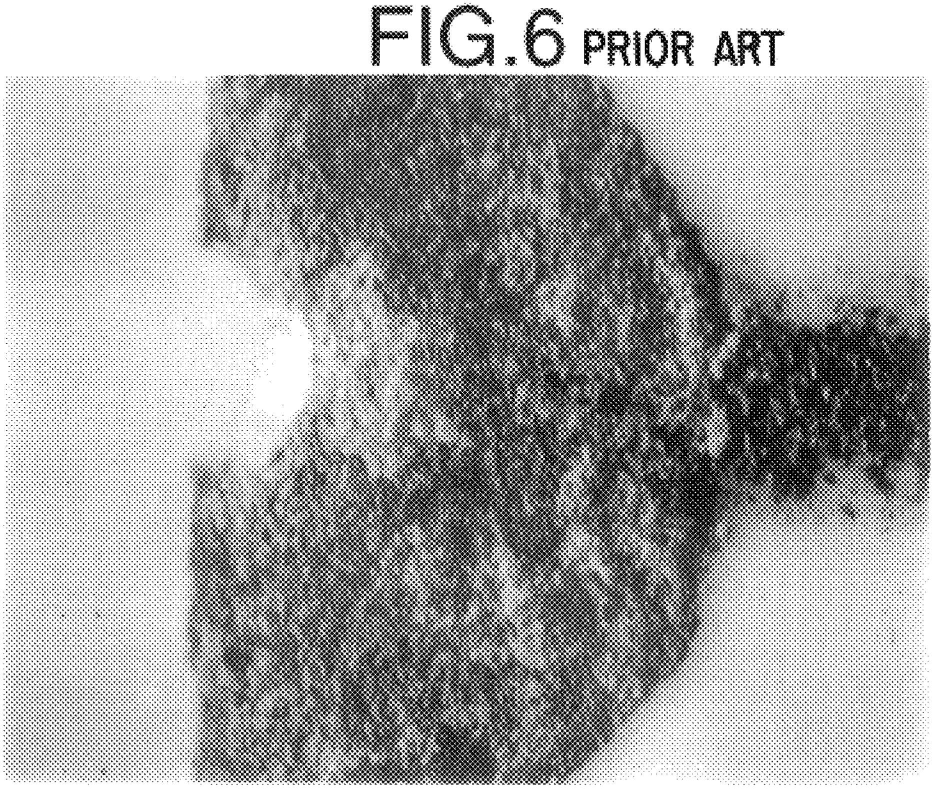
FIG.6 PRIOR ART
FIG. 6 is a microscopic photograph showing the tail of the discharge electrode of a conventional surface discharge element after being used continuously for an elongated period.
Figure 7:
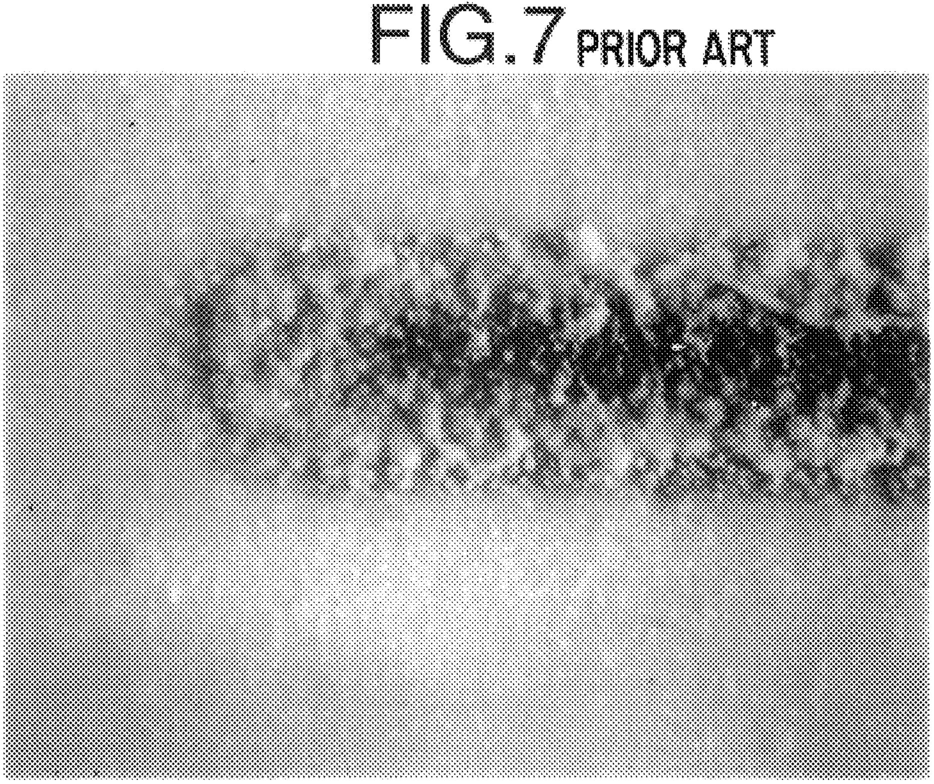
FIG.7 PRIOR ART
FIG. 7 is a microscopic photograph showing the head of the conventional discharge electrode of the surface discharge element of FIG. 6.

FIG. 4 is a microscopic photograph showing the tail of the discharge electrode of the surface discharge element, and FIG. 5 is a similar microscopic photograph but showing the head of the discharge electrode. The surface discharge element was used continuously for one and half months by applying voltage of 10 KHz, 8 KV to the element. As seen from these microscopic photographs, little or no defects are caused in the tissue of the electrode. A conventional surface discharge element with plasma-sprayed titanium nitride electrodes was operated in same condition. As seen from the microscopic photographs of FIGS. 6 and 7, non-conductive oxides appear in the end and consecutive edge of the electrode where electric discharges are liable to be localized, thereby preventing appearance of electric discharges in these areas. As a result the discharge electrode has become, in fact, thinner.

As is apparent from the above, a surface discharge element according to the present invention is significantly resistive to erosion by electric discharge, and can be used for an elongated period. Also, advantageously the surface discharge element structure facilitates mass production. No lead scattering is caused in use. This is advantageous to the conservation of environment, particularly ozone treatment of foods.

What is claimed is:

1. A surface discharge element comprising:

a dielectric substrate;

a discharge electrode on one surface of said substrate; and an inductive electrode on the other surface of said substrate;

wherein at least said discharge electrode comprises a thick film conductor made of conductive powder and lead-free glass as main constituents.

2. A surface discharge element according to claim 1 wherein each of said discharge electrode and inductive electrode has an insulating protective layer of lead-free glass thereon.

3. A surface discharge element according to claim 2 wherein said insulating protective layer contains oxide filler.

4. A method of making surface discharge elements comprising:

preparing a paste including conductive powder and lead-free glass as main constituents;

applying the paste to one surface of a dielectric substrate in the form of discharge electrode, and to the other surface of the dielectric substrate in the form of inductive electrode; and firing the printed electrode patterns.

* * * * *